United States Patent [19]

Fish et al.

[11] Patent Number: 4,762,212

[45] Date of Patent: Aug. 9, 1988

[54] LOCK ACTUATOR ASSEMBLY AND CARD READER

[75] Inventors: Aaron M. Fish, Cote St. Luc; Leon Mayzels, Montreal; Alexander Branover, Cote St. Luc; Masoud Miresmaili, LaSalle; Jean-Paul Dausseing, Chomedey Laval, all of Canada

[73] Assignee: Ilco Unican Inc., Montreal, Canada

[21] Appl. No.: 779,455

[22] Filed: Sep. 24, 1985

[51] Int. Cl.⁴ ........................ F16D 11/04; E05B 47/06

[52] U.S. Cl. ........................................ 192/24; 70/283; 235/482

[58] Field of Search ........................ 192/25, 83, 24, 22; 70/223, 268, 269, 283; 235/482

[56] References Cited

U.S. PATENT DOCUMENTS

| | | | |
|---|---|---|---|
| 2,226,917 | 12/1940 | Zeruneith | 192/24 X |
| 2,910,859 | 11/1959 | Allen et al. | 70/238 X |
| 3,677,043 | 7/1972 | Cox | 70/268 X |
| 4,177,657 | 12/1979 | Aydin | 70/223 X |
| 4,460,077 | 7/1984 | Geisthoff | 192/24 X |
| 4,488,036 | 12/1984 | Butts . | |
| 4,592,453 | 6/1986 | Fish et al. | 192/0.02 R |

*Primary Examiner*—Rodney H. Bonck

*Attorney, Agent, or Firm*—Fleit, Jacobson, Cohn & Price

[57] ABSTRACT

An actuator assembly is mounted in a housing and is actuatable by a solenoid carried in the housing. The housing also includes, integral therewith, a card reading arrangement.

5 Claims, 6 Drawing Sheets

FIG. 2
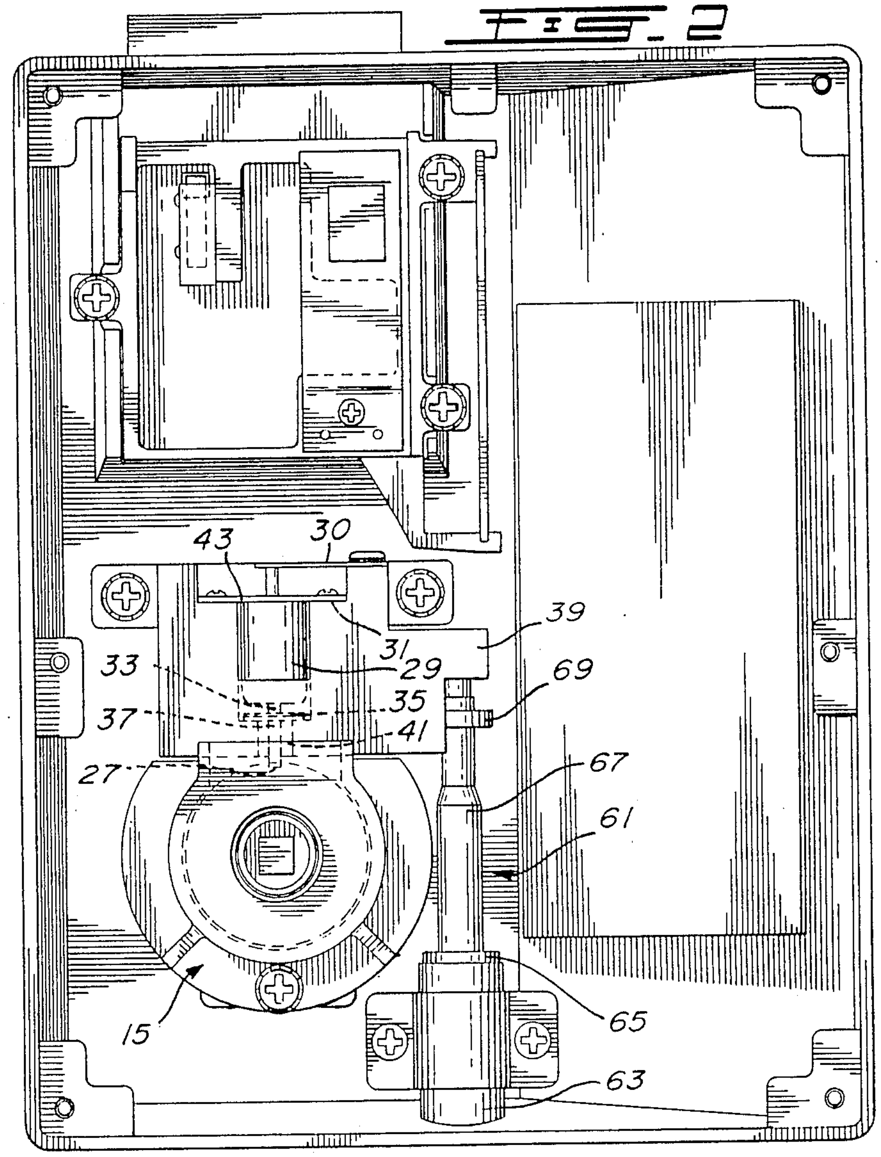
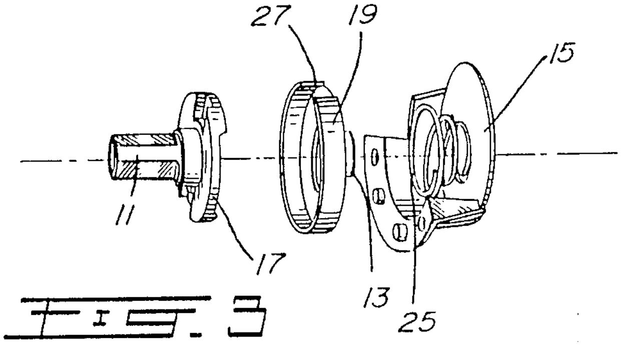
FIG. 3

FIG. 9
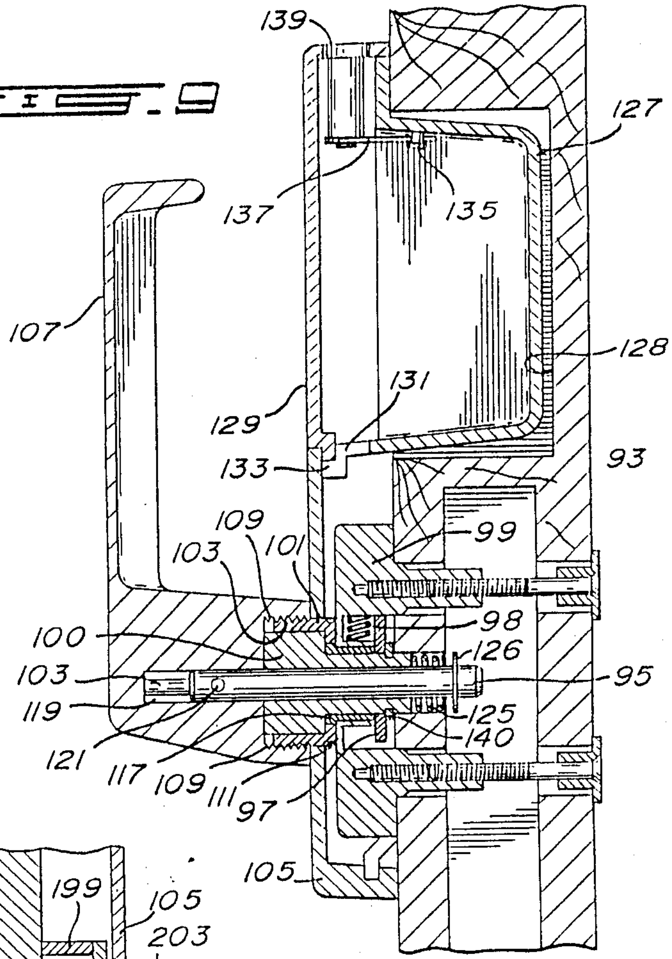
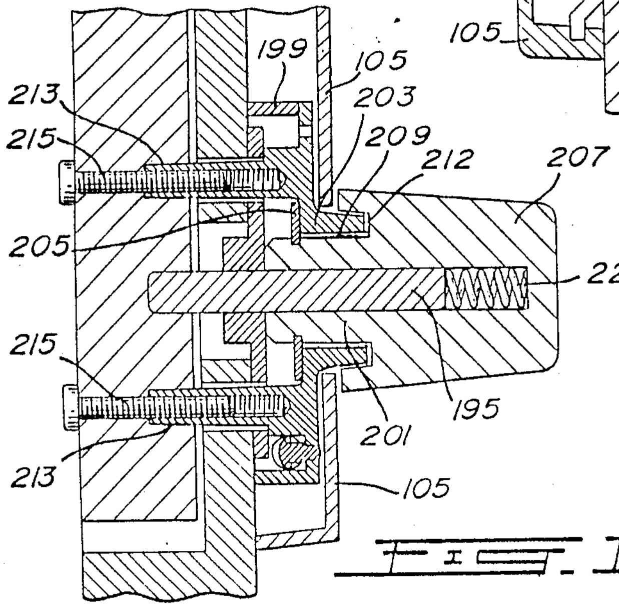
FIG. 11

LOCK ACTUATOR ASSEMBLY AND CARD READER

BACKGROUND OF INVENTION

1. Field of the Invention

The invention relates to an actuator assembly mechanism and a housing therefor.

In one aspect of the invention, the actuator assembly mechanism includes an input disc and an output disc, the output disc being rotatable only once, when the assembly is actuated, within a given time span, and wherein the output disc is not rotatable if the input disc is not rotated within the time span.

In another aspect of the invention, the actuator assembly mechanism housing has included integral therewith a card reader arrangement.

2. Description of Prior Art

Our co-pending application Ser. No. 593,833, filed Mar. 27, 1984, now U.S. Pat. No. 4,592,453 describes an actuator assembly mechanism of the above general description. The present arrangement is an alternative to our earlier arrangement.

It is also known in the art to use card reader arrangements for actuating actuator assembly mechanisms. One such card reader is shown in U.S. Pat. No. 4,488,036, Butts, Dec. 11, 1984. Although Butts attacks the problem of coins entering slot 18, he does not even consider the problem of liquids, or other foreign objects, falling into the slot.

SUMMARY OF INVENTION

It is therefore an object of the invention to provide an actuator assembly mechanism which meets the above general description but which does so with an arrangement alternative to the arrangement taught in our copending application.

It is a further object of the invention to provide a card reader arrangement which is integral with the actuator mechanism housing and which is designed to permit easy removal of foreign objects from the slot thereof.

In accordance with the invention there is provided an actuator assembly mechanism comprising a clutch mechanism having an input disc and an output disc and means for rotating the input disc. Means are provided for preventing rotation of the output disc with the input disc when the assembly is in a rest condition, and for permitting a rotation transmitting connection between the input disc and the output disc when the assembly is in an actuated condition. Means for automatically returning the assembly from the actuated condition to the rest condition: (1) if the first input disc is rotated within a given time delay, upon the rotation; or, (2) if the first disc is not rotated within the given time delay, upon expiration of the time delay. Thus, the second output disc can be rotated only once within the time delay, and the second disc is not rotatable if the first disc is not rotated within the time delay. The means for preventing rotation of the output disc with the input disc consists of an opening in the output disc and a solenoid means having a shaft member, the solenoid means being positioned relative to the output disc such that the shaft member is adapted to extend into the opening in the output disc, as well as a system for driving the solenoid. Thus, the output disc is fixed in position to thereby prevent rotation of the output disc with the input disc.

The actuator assembly is housed in an outer casing, and the housing includes, integral therewith a card reader arrangement which includes a bottom open window.

A security arrangement for mounting a rear door handle consists of a floating collar having an external thread for mating with an internal thread on the handle, the threads being tightenable and loosenable only by a special tool. Alternatively, the rear door handle can be fixed in place by a C-clip.

BRIEF DESCRIPTION OF DRAWINGS

The invention will be better understood by an examination of the following description together with the accompanying drawings in which:

FIG. 2 is a rear view of FIG. 1;

FIG. 3 is an exploded perspective view of the clutch mechanism;

FIG. 9 is a horizontal cross section of a rear handle mounting assembly;

FIG. 11 is a vertical cross section of an alternate rear handle mounting assembly.

DESCRIPTION OF PREFERRED EMBODIMENTS

Figure 1:
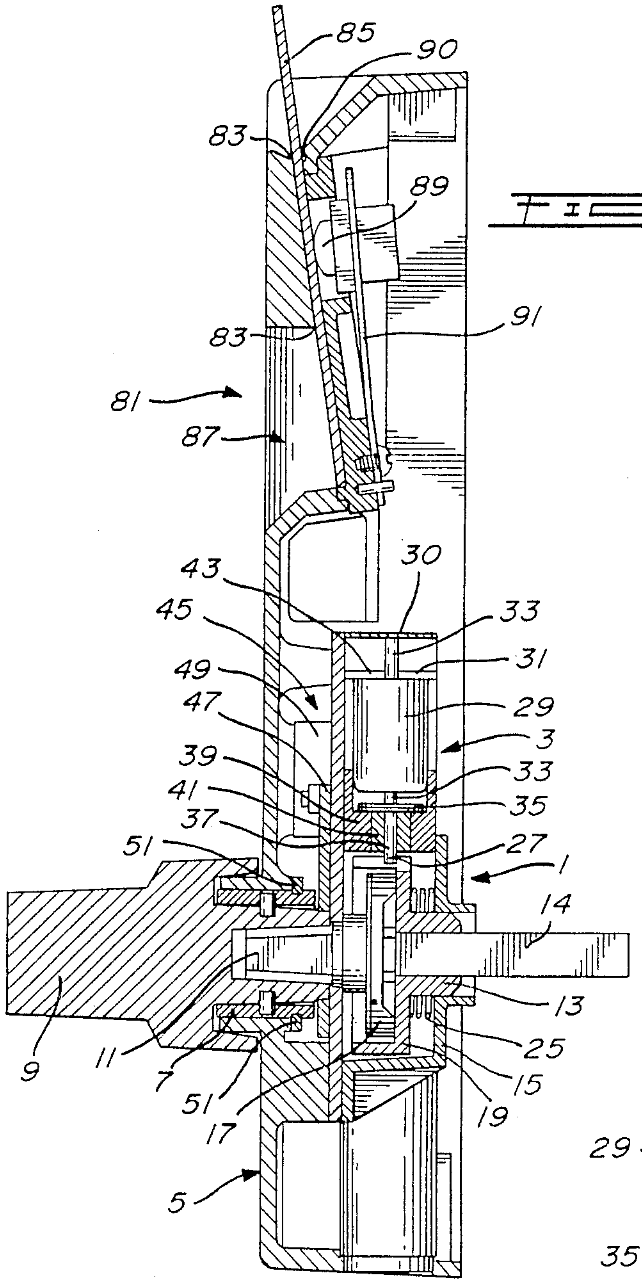
FIG. 1 is a side view of an actuator assembly mechanism, in accordance with the invention, shown in its rest condition with a card inserted in the slot of the card reader, portions thereof being shown in section.

Referring now to FIGS. 1 and 2, the actuator assembly mechanism includes a clutch mechanism, illustrated generally at 1, and means, illustrated generally at 3, for preventing or permitting a rotation transmitting connection of the clutch mechanism. The actuator assembly mechanism is housed in a housing 5, mounted on the front (outside) of a door and having an opening 7 therethrough at the front end of the assembly. A knob, or handle, hub 9, which is spring loaded, as will be shown below, to return to its initial position, extends through the opening and is in rotation transmitting communication with a connecting member 11 at the input of the clutch.

A shaft receiving member 13 is disposed at the output side of the clutch mechanism. The clutch mechanism is housed in a clutch cover 15.

Referring to FIG. 3, the clutch member includes an input disc 17, which is connected to the input connecting member 11, for rotation therewith, and an output disc 19, which is connected to the shaft receiving member 13 for rotation therewith. The shaft receiving member 13 receives a drive shaft 14. The connecting member 11 is connected to hub 9 for rotation therewith so that the input disc 17 rotates with the rotation of hub 9.

Figure 4:
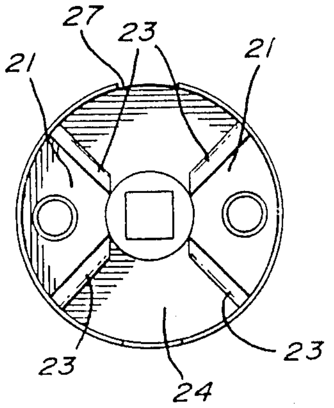
FIG. 4 illustrates the facing surfaces of the input and output discs of the clutch mechanism.

As the facing surfaces of both input and output discs are identical, only the facing surface of the output disc is shown in FIG. 4 to illustrate the facing surfaces of both input and output discs.

The facing surfaces of both the input and output discs include diametrically opposed abutments 21 having bevelled surfaces 23 at their terminating edges. The abutments are disposed on, and rise above, a lower surface 24 and are preferably formed integrally with the lower surface.

Returning to FIG. 3, disposed in the clutch cover is a spring means 25 which urges the output disc against the input disc. Closing slot means comprising, for example, a slot 27 is disposed on the upper peripheral surface of the output disc 19 as can also be seen in FIGS. 1 and 2.

The clutch mechanism operates in a manner known in the art, namely, with the spring 25 urging the output disc against the input disc, and with the abutments of the input disc being arranged to be located on the lower surfaces of the output disc, and vice-versa, when the input disc is rotated, the output disc will also rotate. However, if the output disc is held against rotation, for example, by applying the fixed means in the closing slot 27 thereof, rotation of the output disc will not be possible even when the input disc is rotated, whereby to prevent a rotation transmitting connection of the clutch. Instead, the bevelled surfaces of the input disc will cam with the bevelled surfaces of the output disc to push the output disc rearwardly against the force of spring 25. Thus, the rotation of the input disc will still be possible, however, the rotation of the input disc will, in this condition, not be transmitted to the output disc.

Thus, means for permitting a rotation transmitting connection of the clutch comprises a means for removing the fixed means from the closing slot 27.

As above-mentioned, the means for permitting a rotation transmitting connection of the clutch is illustrated generally at 3 and comprises a solenoid 29 (see FIGS. 1, 2 and 7) mounted on a solenoid mounting plate 31. Extending downwardly from the solenoid is a solenoid shaft 33 which is attached to a limiting disc 35 at the bottom end thereof, and whose top end abuts spring member 30.

Extending downwardly and centrally of the limiting disc 35 is a blocking pin 37. As can be seen in FIGS. 1 and 2, the blocking pin 37 will extend into the slot 27 when the assembly is in its rest condition. With the blocking pin in the slot 27, the output disc is held against rotation, so that rotation of the input disc will not be transmitted to the output disc.

The solenoid is contained in a solenoid housing 39, and the blocking pin 37 extends through a wear-resistant reinforcement bushing 41 in the housing 39. The wear-resistant bushing accurately guides the travel of the pin 37 and prevents wear resulting from such travel, and provides protection against material deformation from lateral forces of the pin.

The clutch mechanism and means for effecting rotation transmitting connection are mounted on a mounting plate 43.

As in the above-mentioned co-pending application, it is desirable to detect rotation of the handle (connected to the hub 9) in order to signal to the processor that the solenoid should be activated as will be seen below. Means for detecting handle rotation is illustrated generally at 45 in FIGS. 1 and 5 and includes a stop plate 47.

Figure 5:
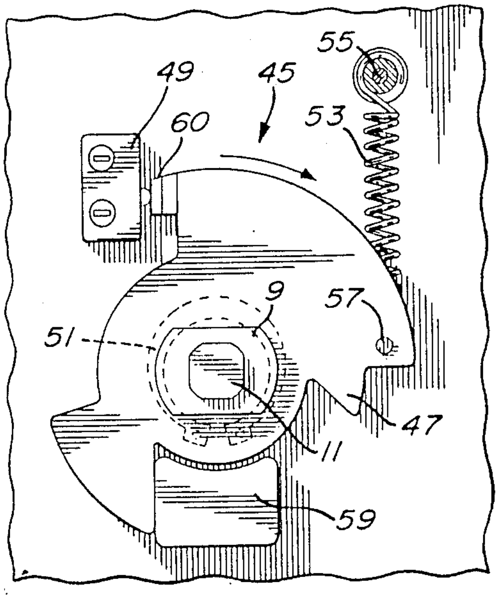
FIG. 5 illustrates means for sensing that the handle has been turned.

Referring to FIG. 5, one end 60 of the stop plate 47 abuts against a switch arrangement 49. A retaining ring 51 is provided to prevent hub 9 from sliding out of the housing 5.

A spring means 53 has one end connected to a fixed point 55 on casing 5 and the other end connected to point 57 on the stop plate. Stop plate limiter 59, which is part of casing 5, limits the rotary motion of the stop plate and thereby the rotary motion of the hub 9.

In the illustrated embodiment, the hub 9 is rotated in a clockwise direction (FIG. 5) and the stop plate 47 is rotated with it. When the hub 9 is released, the spring means 53 will cause the stop plate 47 to rotate in a counter-clockwise direction (FIG. 5) until the edge 60 of the stop plate abuts against the stop-plate limiter 59 and thereby against switch arrangement 49.

In the illustrated embodiment, switch 49 is of that kind which is closed in its normal condition, i.e., it must be pressed to be opened. With stop plate 47 in its rest condition, as illustrated in FIG. 5, end 60 of the stop plate is pressed up against the switch 49 so that the switch 49 is open. When the hub 9, and therefore stop plate 47, is rotated in the clockwise direction, as soon as edge 60 releeses the switch 49 (which happens when handle is even slightly rotated, i.e., between 1° and 5°), switch 49 will change state, i.e., it will assume its normal condition and will therefore be closed, i.e., the circuit of which it is a part will be complete. This circuit will then provide a signal that the handle has been rotated. When hub 9 is released, plate 47 will return to the position shown in FIG. 5, that is, with the end 60 of plate 47 abutting against the switch 49, and the switch 49 will again be open.

In operation, the mechanism works as follows:

In order to change the assembly from its rest condition to its actuated condition, the solenoid 29 must be actuated. The solenoid can be actuated by means well known in the art, for example, a keyed mechanism, or an electronic or mechanical numerical combination means, or other means well known in the art. In the present application, it is contemplated to use a card reader arrangement which will read a magnetically encoded card.

As will be seen below (with reference to FIG. 6), if the card includes a valid activation code, then as soon as the handle (connected to hub 9) is rotated in a clockwise direction, power will be provided to the solenoid to actuate it.

Figure 1A:
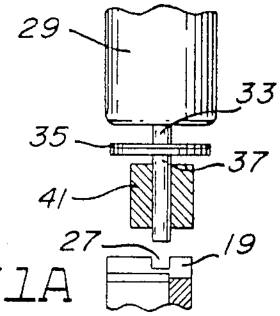
FIG. 1A is a portion of FIG. 1 showing the actuator assembly mechanism in its actuated condition.

When the solenoid is actuated, the solenoid shaft 33 is lifted upwardly, against the force of spring member 30, lifting with it both the limiting disc 35 and the blocking pin 37 so that the blocking pin is moved out of the slot 27 as shown in FIG. 1A. With pin 37 out of slot 27, there is permitted a rotation transmitting connection between the hub 9 and the output shaft 14. Accordingly, 14 will rotate when 9 is rotated and when the actuating assembly is in its actuated condition.

Power is applied to the solenoid and then removed a short time (⅓ sec.) later. However, by that time, the rotation of the handle will have caused rotation of the output disc. Thus, when the blocking pin 37 drops because power is removed from the solenoid, it will fall onto the outer surface of the output disc, and it will loosely ride on this outer surface as long as the handle is out of its normal position. When the handle is returned to its rest position, returning the output disc to its rest position, the blocking pin 31 will fall into slot 27 of the output disc. Spring 30 is provided to provide a downward push on the shaft 33 should gravity not provide sufficient pull to pull the shaft 33 downwardly.

The hub 9 is connected to, for example, a door knob lever handle or the like for rotation, and the shaft 14 can comprise the shaft of, for example, a latch mechanism or the like to retract the latch of a lock as is well known in the art. It will be seen that the assembly is automatically returned to the rest condition from the actuated condition either after a single opening or after a predetermined time delay.

The mechanism is under the control of an electronic processor which receives data both from the card reader and from the switch 49. Although the processor will have several other functions, we will consider here only its operation in providing power to the solenoid at the appropriate time.

Figure 6:
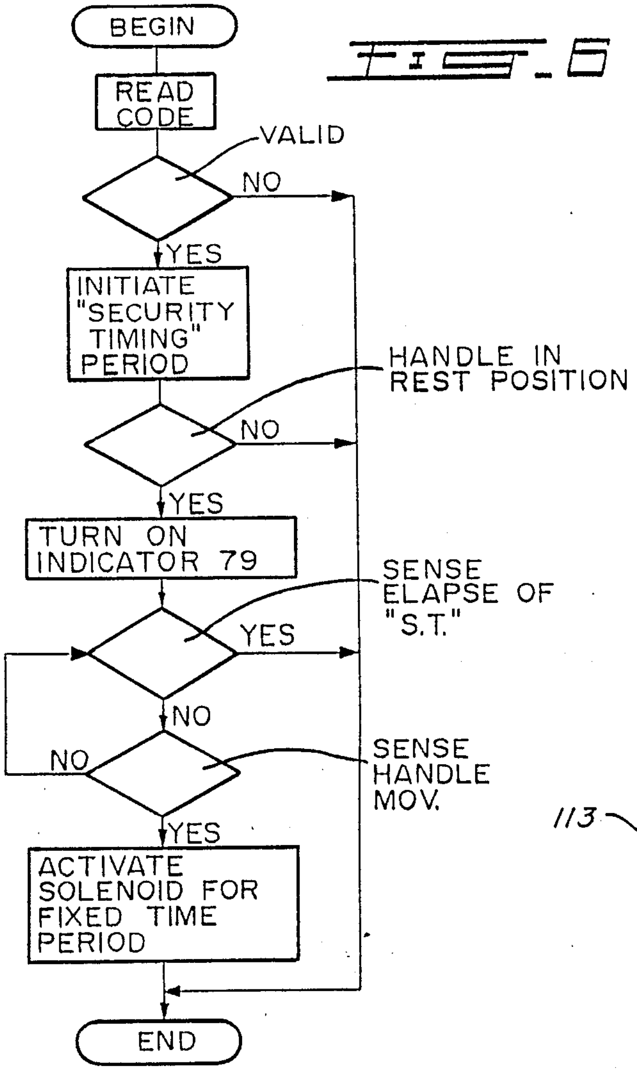
FIG. 6 is an operational flow chart for process control for the inventive actuator assembly mechanism.

FIG. 6 illustrates an operational flow chart of the software which drives the processor. Each cycle of the processor starts, as is well known, with a BEGIN step. The BEGIN step in this case would be actuated by the insertion of a coded card into the card reader arrangement, which insertion is sensed by a card-in sensor means 90 (see FIG. 1), i.e., a switch which is tripped by the card as it is being inserted. The tripping of the switch activates both the micrprocessor and the reader, which would be normally unactivated, for their respective functions. The sensor means 19 also senses when the card is removed from the slot whereby to ensure that the card is not accidentally left in the slot after the door is opened.

The processor would then read the code on the card and determine whether or not this is a valid code. If it is not a valid code, then the program skips to the END, thus avoiding actuation of the assembly, and is ready for the beginning of a new cycle.

If the code is valid, then the processor initiates a security timing period.

In one embodiment, if it is desired to prohibit actuation of the assembly if the handle is turned before there is an indication that the handle should be turned, the switch 49 is checked to determine whether the handle is in the rest position. If it is not, then the program will skip to the END thus prohibiting the actuation of the assembly.

Figure 8:
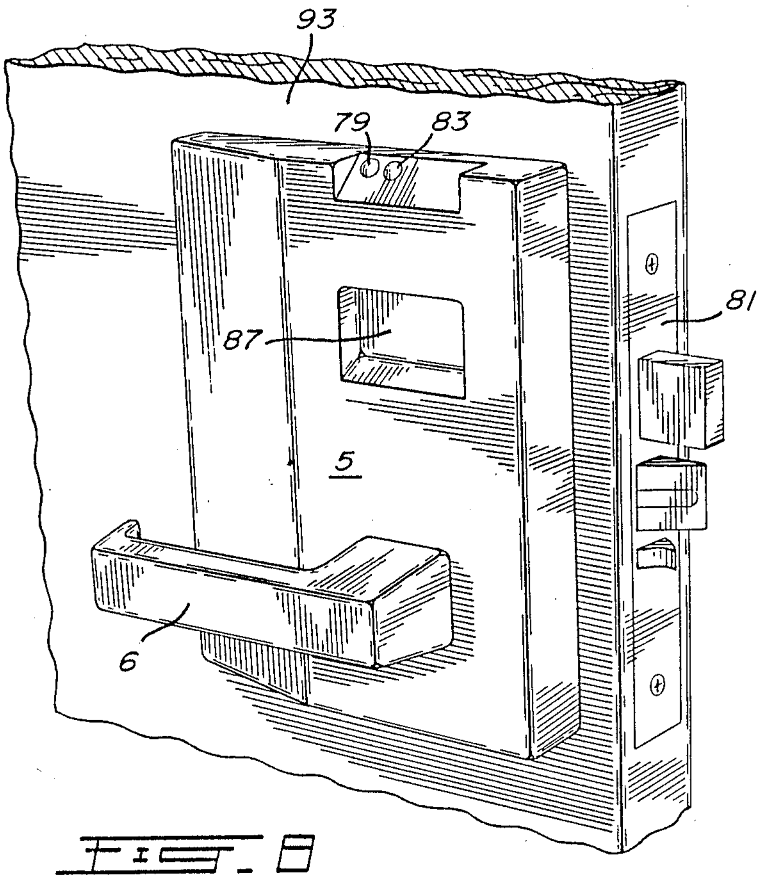
FIG. 8 is a perspective view of the housing.

If the handle is in its rest position, then an indicator, such as indicator 79 in FIG. 8, is turned on indicating to the user that he can now rotate the handle.

The processor now senses alternately in cycles two conditions, namely, whether the security timing period has elapsed and whether the handle has been rotated. If, in any one of the cycles, the security timing period has not elapsed, and the handle has been rotated, then the solenoid is activated for a predetermined period, e.g., $\frac{1}{3}$ sec. The cycle is then completed and the processor is ready to begin a new cycle.

If, on the other hand, the security timing period elapses without the handle being rotated, then the program will once again skip to the END and the actuator mechanism will not be activated.

Figure 6A:
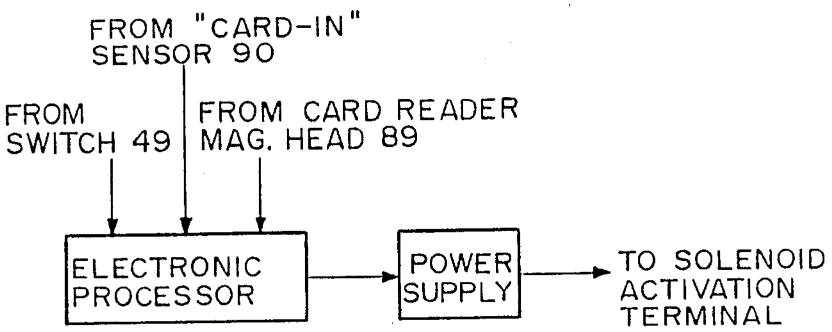
FIG. 6A is a purely schematic illustration of the physical process which takes place in the operation chart of FIG. 6.

FIG. 6A is a purely schematic illustration of the physical process which takes place. As can be seen, the electronic processor receives input from switch 49, card-in sensor 90, and the card reader magnetic head 89 (see FIG. 1). It provides an output to the power supply to provide power to activate the solenoid under the appropriate conditions.

Figure 7:
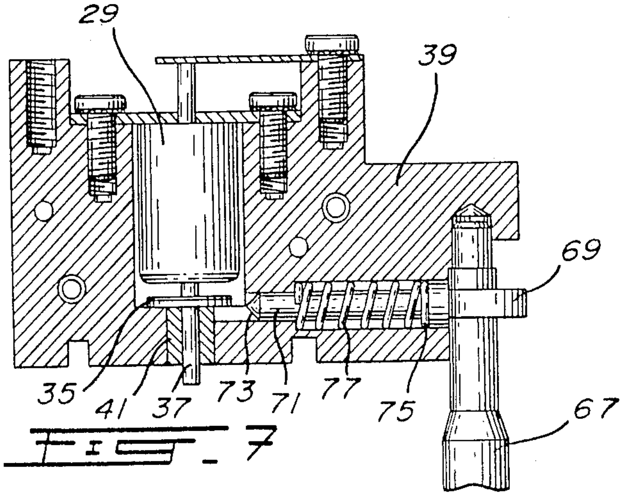
FIG. 7 is a partial view of FIG. 2 in section showing how the override mechanism operates.

In some instances, it may be necessary to override the rest condition of the actuator assembly by purely mechanical means, for example, in the event of battery failure. For this purpose, override mechanism, illustrated generally at 61 in FIGS. 2 and 7 is provided. As seen in these Figures, the override mechanism comprises a cylindrical core 63. In the illustrated embodiment, as the override mechanism has to extend for a distance greater than the distance of the cylindrical core itself, there is provided a cylindrical core adapter 65 and a cylindrical core extension member 67 connected to the adapter 65 whereby the extension 67 will rotate with the cylindrical core 63. It is of course understood that the adapter 65 and the extension 67 are required only when the override mechanism must extend for a distance greater than the distance of the core 63 itself.

Disposed at the free end of the extension 67 is an override cam member 69. Extending into the solenoid housing at right angles to the extension member 67 is an override plunger 71. The plunger 71 has a camming end 73 and a disc end 75. Spring means 77 has one end thereof abutting against the disc end 75 and the other end abutting against a stopping edge of the solenoid housing.

In operation, the override mechanism works as follows:

When the core 63 is rotated, extension member 67 will rotate with it and cam 69 will abut against the plunger 71 and force the plunger inwardly, that is, to the left in FIG. 7. The camming end of the plunger will act against the limiting disc 35 to raise the limiting disc and to thereby lift the blocking pin 37 out of the slot 27 against the action, of spring 30. Thus, the actuator assembly will assume the position shown in FIG. 1A, that is, the actuated condition.

When the core 63 is again rotated to return the cam to the position shown in FIGS. 1 and 7, spring 75 will force plunger 71 rearwardly, that is, to the right in FIG. 7 so that it will return to the position illustrated in FIG. 7. It will of course be appreciated that the core 63 can rotate only by use of an appropriate key.

Referring now to FIGS. 1 and 8, the housing for the mechanism is shown to include the casing 5 and a handle 6 which is connected with the hub 9 as is well known.

The card reader assembly, illustrated generally at 81, includes a slot 83 for receiving a card 85. The card reader arrangement also includes a window 87 which is in communication with the slot 83. The inclusion of the window permits a user to see that the card has been inserted as far as it should go. It also makes it easy and convenient to clean the arrangement and especially to dislodge any foreign objects which might get stuck in the slot.

The card reader assembly also includes a magnetic head 89 for reading the code on the card as is also well known in the art, and a card-in sensor means 90. The sensor means 90 is located so that the card activates the sensor 90 before or at the same time that it reaches the head 89. The magnetic head is mounted on a spring 91 which biases it in the direction of the card so that there will be good physical contact between the magnetic head and the coded portion of the card.

In operation, a coded card is inserted in the slot and the code on the card is read by the magnetic head and provided to the processor as illustrated schematically in FIG. 6A.

Considering now the rear door handle, attention is directed to FIG. 9 which illustrates a security arrangement for mounting such a handle. As can be seen, the rear door handle is mounted adjacent the rear (inside) surface 93 of the door. It includes a spring-loaded square shaft 95, a stop plate 97, a return spring 98 and a rosette 99. The rosette, stop plate and return spring are provided so that handles of the type illustrated in FIG. 8 will, upon release, move to their rest (horizontal) position.

Mounted on the shaft 95 is a flange 100 with a floating collar 101 which has external threads 103. The floating collar, rosette and shaft 95 arrangement are encased by casing 105.

The handle 107 has internal threads 109 which mate with the external threads 103 whereby to mount the handle on the floating collar.

Figure 10:
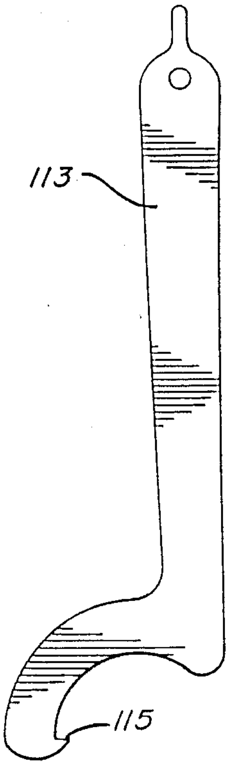
FIG. 10 illustrates a special tool used with the FIG. 9 handle assembly.

A portion 111 of the floating collar 101, which is formed integrally with the floating collar, has its outer periphery notched with equally spaced notches. By using a tool such as the tool 113 illustrated in FIG. 10, and having the protuberances 115 engage different ones of the notches, the floating collar can be rotated about the axle 95 as will be further discussed below. Plastic bearing 11 is provided between the flange 100 and the central opening of the rosette to ease movement of the flange 100 relative to the rosette.

The shaft 95 is square in cross-section, and the handle includes an opening 119 which has a cross-sectional shape similar to the cross-sectional shape of the floating shaft. Because both cross-sectional shapes are discontinuous, when the handle 107 is rotated, the shaft 95 will rotate with it.

Pin 121 extends from opposing sides of the shaft 95 to prevent the shaft 95 from falling out of the flange 100. In order to permit the shaft 95 to move in the opening 119, slots 123 are formed on either side of the opening to accommodate both ends of the pin 121.

Spring 125, which abuts, at one end thereof, against the flange 100, and, the other end thereof, against C-clip 126, maintains the shaft 95 in an extended position to extend into a hub in a lockset as known in the art.

As is seen, the casing 105 includes a cavity 127, which is mounted in recess 128 in the door, with a cover plate 129. An opening 131 is included in the cavity.

The plate 129 is mounted on the casing by inserting one end thereof into the slotted opening 133. At the other end, a post 135 is mounted on a surface of the indented portion. A hook member 137 engages the post 135 to lock the cover plate 129 onto the casing when the hook member is rotated by a key which is received in a key receptacle 139.

In operation, to mount the handle, the assembly including the rosette, the floating collar, flange, stop plate, return spring, and the shaft is mounted on the door. The casing 105 is placed on the door, and then the handle is placed over the floating collar so that teeth 109 are close to teeth 103. With cover 129 removed, tool 113 is inserted through opening 131 to engage the notches on portion 111 of floating collar 101. The tool is rotated to thereby rotate the floating collar so that the screw threads 103 will mesh with and engage screw threads 109. This is continued until the floating collar can no longer be rotated, i.e., the handle is fully mounted on the floating collar. The shaft 95 will, of course, extend into the opening 119.

The cover plate 129 is then placed in position with one end in the slotted opening 133, and the key is inserted in receptacle 139 and rotated so that the hook 137 will engage the post 135. With the cover plate 129 in its mounted position, the handle can no longer be removed from the collar as access to opening 131 is blocked by the cover plate 129.

If it is desired to remove the handle from the collar, cover plate 129 is removed by first rotating the key in receptacle 139 so that the hook 137 no longer engages the post 135. The other end is then removed from the slotted opening 133 so that there is once again access to the opening 131. The tool is inserted through the opening, and the floating collar is rotated to unscrew the collar from the handle.

C-clip 140 is provided to hold together the assembly of the flange, floating collar, stop plate, the return spring and the rosette.

The opening in the cavity 127 can be used to store batteries to provide power to the actuating assembly and the processor.

An alternate arrangement is illustrated in FIG. 11. The embodiment illustrated in FIG. 11 also includes a casing 105. Although not shown in FIG. 11, the casing 105 of the FIG. 11 embodiment includes a cavity 127 having an opening 131. Access to the opening can be prevented by also providing a cover plate 129.

The FIG. 11 embodiment also includes a spring-loaded shaft 195 which is square in its cross-sectional shape, and the shaft is inserted in a square opening in the handle 207 so that the shaft will rotate with the handle. Spring 225 maintains the shaft in its fully extended position as shown in FIG. 11.

However, the member 201 in the FIG. 11 embodiment is not a floating collar but is, rather, formed integrally with the handle 207. Collar 203, formed integrally with rosette 199 embraces the member 201, and plastic bearings 209 and 211 ease the movement of the member 201 relative to the collar 203. C-clip 205, which abuts against the bottom surface of the collar 203, maintains the handle fixed in position as shown in FIG. 11. The C-clip can be mounted onto the member 201 by a special tool through the opening 131 in the casing, and an aligned opening in the rosette (not shown), and the C-clip can also be removed from its position by use of a suitable, but different, tool through the same opening. Accordingly, once again, it would be necessary to remove the cover plate 129, using a key, before the handle 207 can be removed.

Posts 213 extend through an opening in the lock set and mate with screws 215 which are inserted through an outer surface of the front of the door.

A similar arrangement would be included in the FIG. 9 embodiment.

The security arrangements illustrated in FIGS. 9 and 11 can be used in association with the assembly as illustrated in FIGS. 1 et seq. of the present application. Alternatively, these security arrangements could be used in association with other assemblies as appropriate.

Although a particular embodiment has been above-described, this was for the purpose of illustrating, but not limiting, the invention. Various modifications, which may come to the mind of one skilled in the art, are within the scope of the invention as defined in the appended claims.

We claim:

1. An actuator assembly mechanism comprising:

a clutch mechanism having an input disc and an output disc;

means for rotating said input disc;

means for actuating for changing the state of said assembly from a rest condition, when said means for actuating is unactuated, to an actuated condition, when said means for actuating is actuated;

means for preventing rotation of said output disc with said input disc when said assembly is in a rest condition, and for permitting a rotation transmitting connection between said input disc and said output disc when said assembly is in an actuated condition;

means for automatically returning said assembly from said actuated condition to said rest condition: (1) if said first input disc is rotated within a given time delay, upon said rotation; or, (2) if said first disc is not rotated within said given time delay, upon the expiration of said time delay;

whereby said second output disc can be rotated only once within said time delay, and whereby said second disc is not rotatable if said first disc is not rotated within said time delay;

said means for preventing rotation of said output disc with said input disc comprising:

an opening in said output disc;

solenoid means having a shaft member, said solenoid means being positioned relative to said output disc such that said shaft member is adapted to extend into said opening in said output disc;

whereby to fix said output disc in position to thereby prevent rotation of said output disc with said input disc;

said shaft member extending into said opening in said output disc when said solenoid is in its unactuated condition;

and further including means for actuating said solenoid whereby to remove said shaft member from said opening in said output disc whereby to permit a rotation transmitting connection between said output disc and said input disc;

said means for rotating said input disc comprising a hub means rotatable with said input disc;

said hub means mounting a handle rotatable with said hub; and means for sensing movement of said handle;

and further including a card reader arrangement for reading codes on an encoded card, and for sensing when a card is inserted in said card reader arrangement;

wherein said means for actuating comprises said card reader arrangement, said means for sensing when a card is inserted in said card reader arrangement, and said means for sensing movement of said handle;

whereby, when said card reader arrangement reads a valid code on said encoded card, and when said handle movement is sensed, said solenoid is actuated.

2. An assembly mechanism as defined in claim 1 wherein said means for sensing movement of said handle comprises a stop plate rotatable with said handle;

switch means;

one end of said stop plate being adapted to abut said switch means when said handle is in a rest position;

the state of said switch being changed when said one end of said stop plate is moved away therefrom;

whereby the charge of state of said switch is indicative of movement of said handle.

3. An assembly mechanism as defined in claim 2 and further including spring means for returning said stop plate to its rest position.

4. An assembly mechanism as defined in claim 1 and further including override means for mechanically removing said shaft member from said opening in said output disc.

5. An assembly mechanism as defined in claim 4 wherein said means for mechanically removing comprises a limiting disc mounted on said solenoid shaft member; and cam means engaging said limiting disc to thereby move said limiting disc upwardly and to thereby remove said shaft member from said opening in said output disc.

* * * * *